(12) United States Patent
Ernst et al.

(10) Patent No.: US 9,414,611 B2
(45) Date of Patent: Aug. 16, 2016

(54) METHODS FOR TREATING AN OBJECT WITH CHLORINE DIOXIDE

(71) Applicant: ICA TriNova, LLC, Newnan, GA (US)

(72) Inventors: William Ernst, Roswell, GA (US); Joel Tenney, Marietta, GA (US)

(73) Assignee: ICA TRINOVA, LLC, Newnan, GA (US)

( * ) Notice: Subject to any disclaimer, the term of this patent is extended or adjusted under 35 U.S.C. 154(b) by 0 days.

(21) Appl. No.: 14/228,699

(22) Filed: Mar. 28, 2014

(65) Prior Publication Data

US 2015/0173382 A1    Jun. 25, 2015

Related U.S. Application Data

(60) Provisional application No. 61/919,290, filed on Dec. 20, 2013.

(51) Int. Cl.
*A01N 25/32* (2006.01)
*A23B 7/144* (2006.01)
*A23L 3/3409* (2006.01)

(52) U.S. Cl.
CPC ............. *A23B 7/144* (2013.01); *A23L 3/3409* (2013.01)

(58) Field of Classification Search
CPC .............................. A23B 7/144; A23L 3/3409
USPC ......................................................... 422/29
See application file for complete search history.

(56) References Cited

U.S. PATENT DOCUMENTS

| 4,362,753 | A | 12/1982 | Barta |
| 5,278,112 | A | 1/1994 | Klatte |
| 5,314,852 | A | 5/1994 | Klatte |
| 5,464,598 | A | 11/1995 | Klatte |
| 5,567,405 | A | 10/1996 | Klatte et al. |
| 5,573,743 | A | 11/1996 | Klatte et al. |
| 5,730,948 | A | 3/1998 | Klatte et al. |
| 5,776,850 | A | 7/1998 | Klatte et al. |
| 5,853,689 | A | 12/1998 | Klatte |
| 5,885,543 | A | 3/1999 | Klatte |
| 6,174,508 | B1 | 1/2001 | Klatte |
| 6,379,643 | B1 | 4/2002 | Klatte |
| 6,423,277 | B1 | 7/2002 | Gravitt et al. |
| 6,423,289 | B1 | 7/2002 | Klatte |
| 6,458,735 | B1 | 10/2002 | Klatte |

(Continued)

FOREIGN PATENT DOCUMENTS

| EP | 0159660 | 10/1985 |
| WO | 0035495 | 6/2000 |

OTHER PUBLICATIONS

Brickhouse et al. "Effect of Vapor-Based Decontamination Systems on Selected Building Interior Materials: Chlorine Dioxide." EPA/600/R-08/054. Apr. 2008.

(Continued)

*Primary Examiner* — Kevin Joyner

(74) *Attorney, Agent, or Firm* — Meunier Carlin & Curfman LLC

(57) ABSTRACT

The present disclosure relates to a method for treating an object with chlorine dioxide gas, comprising contacting the object with chlorine dioxide gas while exposing the object to less than 1000 lux of light. The disclosed method minimizes chlorine containing residue on the surface of the object. The object can be a raw agricultural commodity (RAC) such as a raw fruit or vegetable.

17 Claims, 1 Drawing Sheet

Chlorine Dioxide Gas Production over Time.

(56) References Cited

U.S. PATENT DOCUMENTS

| | | | |
|---|---|---|---|
| 6,503,419 B2 | 1/2003 | Klatte | |
| 6,635,230 B2 | 10/2003 | Klatte | |
| 7,273,567 B1* | 9/2007 | Wellinghoff et al. | 252/187.23 |
| 7,347,994 B2 | 3/2008 | Tenney et al. | |
| 7,922,992 B2 | 4/2011 | Ernst et al. | |
| 8,622,209 B2 | 1/2014 | Isaac et al. | |
| 2002/0056830 A1 | 5/2002 | Klatte | |
| 2003/0082087 A1 | 5/2003 | Klatte | |
| 2004/0051080 A1 | 3/2004 | Ernst et al. | |
| 2007/0039898 A1* | 2/2007 | Dee | 210/748 |
| 2007/0237671 A1 | 10/2007 | Yuan et al. | |
| 2008/0131395 A1* | 6/2008 | Wellinghoff et al. | 424/76.3 |
| 2010/0075004 A1 | 3/2010 | Nelson et al. | |
| 2013/0287722 A1* | 10/2013 | Uhlmann | 424/76.9 |

OTHER PUBLICATIONS

Crawford and DeWitt. "Decomposition Rate Studies in the Gaseous Chlorine Dioxide-Water System." TAPPI, 1968, 51 (5), pp. 226-230.

McHale and von Elbe. "The Explosive Decomposition of CHlorine Dioxide." Journal of Physical Chemistry. 1968, 72(6), pp. 1849-1856.

Netramai. "Utlization of Chlorine Dioxide Gas in Food Packaging Applications." Thesis. Michigan State University. 2011.

Rao et al. "Perchlorate Fromation by Ozone Oxidation of Aqueous Chlorine/Oxy-Chlorine Species: Role of ClxOy Radicals." Envinronmental Science and Technology. 2010, 44, pp. 2961-2967.

Spinks and Porter. "Photodecomposition of Chlorine Dioxide." JACS, 1934, 56(2), pp. 264-270.

Trinetta et al. "Evaluation of Chlorine Dioxide Gas Residues on Selected Food Produce." Journal of Food Science. 2011, 76, pp. T11-T15.

Xin and Jinyu. "Highly Selective Spectrophotometric Determination of Chlorine Dioxide in Water using Rhodamine B." Analyst. 1995, 120, pp. 1199-1200.

International Search Report and Written Opinion issued Mar. 26, 2015 in related International Application No. PCT/US2014/070713.

* cited by examiner

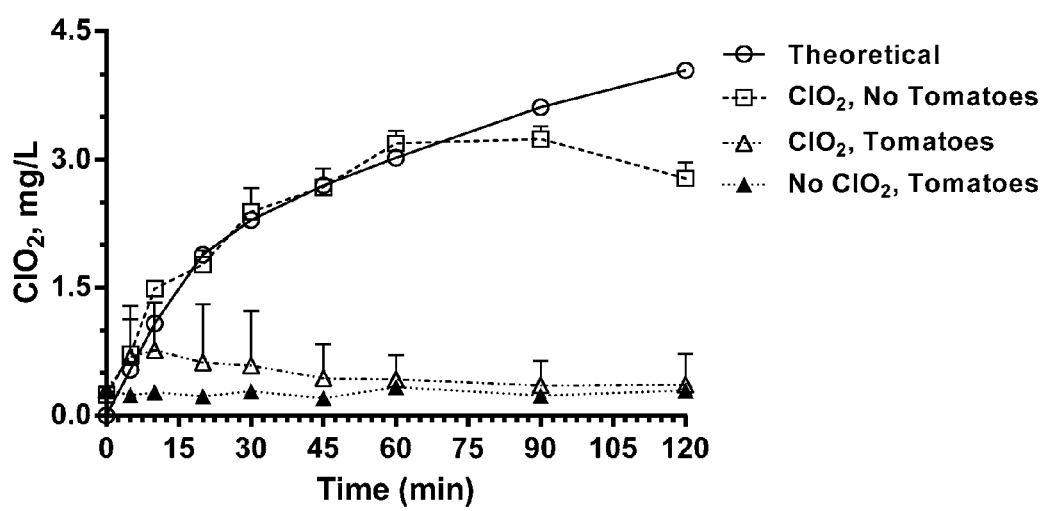
Chlorine Dioxide Gas Production over Time.

METHODS FOR TREATING AN OBJECT WITH CHLORINE DIOXIDE

CROSS-REFERENCE TO RELATED APPLICATIONS

This application claims the benefit of U.S. Provisional Application No. 61/919,290, filed Dec. 20, 2013, which is hereby incorporated herein by reference in its entirety.

FIELD OF THE DISCLOSURE

The present disclosure relates to a method for treating an object with chlorine dioxide gas while minimizing chlorine-containing residue on the object, comprising contacting the object with chlorine dioxide gas while exposing the object to minimal amounts of light. More particularly, the present disclosure relates to a method of reducing and eliminating chlorate and perchlorate by-products formed when using chlorine dioxide gas to disinfect raw agricultural commodities.

BACKGROUND

Chlorine dioxide has been used to kill biological contaminants such as microorganisms, mold, fungi, yeast and bacteria in water and on surfaces. Chlorine dioxide in solution has recently been used to disinfect raw agricultural commodities (RACs) rinse waters. The primary disinfection by-products of water disinfection using chlorine dioxide have been chlorate and chlorite ions. Because of concern about chlorite, chlorate and also perchlorate ions, governmental regulations require that RACs rinsed in water treated with chlorine dioxide must be rinsed with potable water to remove any of these residues. Additionally, chlorine dioxide in rinse water solutions offer little removal of organisms on the surfaces of RACs.

Therefore, there is a need for a method of treating objects such as RACs with chlorine dioxide where undesirable by-products are minimized while sufficiently treating bacteria on the surface of RACs.

SUMMARY OF THE DISCLOSURE

The present disclosure relates to a method for treating the surface of an object with chlorine dioxide gas while minimizing the intensity of light to thereby reduce chlorine containing residue on the surface of the object.

The present disclosure relates to a method for treating an object with chlorine dioxide gas while minimizing chlorine containing residue on the object, comprising contacting the object with chlorine dioxide gas while exposing the object to less than 1000 lux of light. In some embodiments, the exposing step comprises exposing the object to less than 200 lux of light. In some embodiments, the object is contacted with chlorine dioxide in a substantially dark or dark environment. In some embodiments, the object comprises a raw agricultural product. In some embodiments the raw agricultural product includes a fruit, a vegetable or a combination thereof.

In certain embodiments, the method further comprises the step of generating the chlorine gas by mixing dry particles of a chlorine dioxide precursor and a proton generating species. In some embodiments, the chlorine dioxide gas is generated by mixing a sodium chlorite solution and hydrochloric acid solution. In certain embodiments, the chlorine dioxide concentration adjacent to the object is 5 mg/L or less or 2 mg/L or less. In some embodiments, the object is contacted with chlorine dioxide for at least 5 minutes. In some embodiments, the treating step is at a humidity of 70% or less.

In some embodiments, the total amount of chlorate and perchlorate formed on the surface of the object from said contacting step is 190 µg/kg of the object or less. In some embodiments, the total amount of chlorate formed on the surface of the object from said contacting step is 160 µg/kg or less. In some embodiments, the total amount of perchlorate formed on the surface of the object is 30 µg/kg or less.

The details of one or more embodiments are set forth in the description below. Other features, objects, and advantages will be apparent from the description, the figure and the claims.

BRIEF DESCRIPTION OF THE FIGURE

FIG. 1 depicts a graph of the chlorine gas production over time under a variety of conditions.

DETAILED DESCRIPTION

The present disclosure relates to a method for treating an object with chlorine dioxide gas, comprising contacting the object with chlorine dioxide gas while exposing the object to less than 1000 lux of light. The method thereby minimizes chlorine-containing residue such as chlorate, chlorite, and perchlorate ions on the object.

The chlorine dioxide for use in treating the object can be produced using any method known in the art. The term "treating" as used herein includes, but is not limited to, "oxidizing," "sanitizing," "disinfecting" and "sterilizing."

In certain embodiments, chlorine dioxide gas can be produced by mixing dry particles of a chlorine dioxide precursor and a proton generating species. The chlorine dioxide precursor can be selected from any composition capable of producing chlorine dioxide gas when mixed with a proton-generating species. In some embodiments, the chlorine dioxide precursor includes a metal chlorite, metal chlorate, chloric acid, hypochlorous acid, or mixtures thereof. In some embodiments, the metal chlorites and chlorates are in the form of alkali metal or alkaline earth metal chlorites and chlorates. Exemplary metal chlorites include, but are not limited to, sodium chlorite, barium chlorite, calcium chlorite, lithium chlorite, potassium chlorite, magnesium chlorite, and mixtures thereof. Exemplary metal chlorates include, but are not limited to, sodium chlorate, lithium chlorate, potassium chlorate, magnesium chlorate, barium chlorate, and mixtures thereof.

The chlorine dioxide precursor can be provided in any form that allows it to react with protons to produce chlorine dioxide. In some embodiments, the chlorine dioxide precursor is in the form of a powder. In some embodiments, the chlorine dioxide precursor is impregnated in a porous carrier. In some embodiments, the porous carrier is inert. In some embodiments, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some embodiments, the porous carrier is uniformly impregnated throughout the volume of the porous carrier via the pores, channels, and the like, with the at least one chlorine dioxide precursor.

In some embodiments, the porous carrier is impregnated with the chlorine dioxide precursor by using a porous carrier that has a low moisture content. In some embodiments, the low moisture content is 5% or less (e.g., 4% or less, 3% or less, 2% or less, or 1% or less) by weight. In some embodiments, the porous carrier has an initial moisture content above 5% and thus can be dehydrated to produce a moisture content of 5% or less. In some embodiments, the dehydrated porous carrier is then immersed in or sprayed with an aqueous solution of the chlorine dioxide precursor at an elevated temperature (e.g., in the range from 120° F. to 190° F.) and the resulting slurry is thoroughly mixed. In some embodiments, the mixed slurry is then air-dried to a moisture level of from 0% to 20% (e.g., from 2% to 18%, from 4% to 16%, from 6% to 14%, from 8% to 12%) by weight to produce the impregnate (i.e., chlorine dioxide precursor impregnated in a porous carrier) disclosed herein. In some embodiments, the impregnate disclosed herein can be prepared without a drying step by calculating the amount of the aqueous solution of the chlorine dioxide precursor needed to achieve the desired final moisture level (e.g., from 0% to 20%, from 2% to 18%, from 4% to 16%, from 6% to 14%, from 8% to 12% by weight) and adding this amount of the aqueous solution to the dehydrated porous carrier to impregnate the porous carrier. In some embodiments, the porous carrier include from 1% to 50% chlorine dioxide precursor (e.g., from 5% to 45%, from 1% to 35%, from 10% to 30%), from 0% to 20% water (e.g., 15% or less, 10% or less, 5% or less), and from 50% to 98.5% porous carrier (e.g., from 55% to 95%, from 60% to 90%, from 65% to 85%) by weight. In some embodiments, the porous carrier can include from 1% to 35% chlorine dioxide precursor, less than 5% water, and from 65% to 94.5% porous carrier by weight. In some embodiments, the chlorine dioxide is impregnated in zeolite crystals as described above and as described in U.S. Pat. Nos. 5,567,405; 5,573,743; 5,730,948; 5,776,850; 5,853,689; 5,885,543; 6,174,508; 6,379,643; 6,423,289; 7,347,994; and 7,922,992, which are incorporated by reference in their entirety.

In some embodiments, the chlorine dioxide precursor is impregnated into a porous carrier and treated with a base. In some embodiments, the base is any suitable base that can reduce the available protons and inhibit the reaction until the proton-generating species overcomes the base and reacts with the chlorine dioxide precursor, to enhance shelf stability and slow the reaction rate once the mixture is activated. Exemplary bases include, but are not limited to, potassium hydroxide, sodium hydroxide, calcium hydroxide, or a blend thereof.

A proton-generating species as disclosed herein can be any composition capable of generating protons to react with the chlorine dioxide precursor. In some embodiments, the proton-generating species is an inorganic acid, an organic acid, or a salt thereof. In some embodiments, the proton-generating species is in the form of an aqueous acid or a metal salt. Exemplary acids include, but are not limited to, acetic acid, citric acid, phosphoric acid, hydrochloric acid, propionic acid, sulfuric acid, and mixtures thereof. In some embodiments, proton-generating species comprises a metal salt. In some embodiments, the metal salt is a chloride, sulfate, phosphate, propionate, acetate, or citrate that combines with water to produce an acid, i.e., protons. In some embodiments, the metal is an alkali metal, alkaline earth metal, or a transition metal. Exemplary metal salts include, but are not limited to, ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and mixtures thereof. In some embodiments, the proton-generating species is a metal salt that can also act as a water-retaining substance (e.g., $CaCl_2$, $MgSO_4$). In some embodiments, the acid is provided in the form of zeolite crystals impregnated with the acid and are produced by any suitable method.

In some embodiments, the proton-generating species is activated to produce protons by contacting the proton-generating species with a moisture-containing (or water-containing) fluid. In some embodiments, the metal salt is ferric chloride, ferric sulfate, or a mixture thereof, and these iron salts can absorb water in addition to functioning as a proton-generating species. In some embodiments, the moisture-containing fluid is liquid water or an aqueous solution. In some embodiments, the moisture-containing fluid is a moisture-containing gas such as air or water vapor. In some embodiments, the protons produced by the proton-generating species react with the chlorine dioxide precursor to produce chlorine dioxide. The proton-generating species can also be activated other than by exposure to a moisture-containing fluid. In some embodiments, the proton-generating species can be activated and can release protons upon exposure to the water in the powders or impregnated porous carrier containing the chlorine dioxide precursor.

The proton-generating species can be provided in any form that allows the release of protons. In some embodiments, the proton-generating species is in the form of a powder. In some embodiments, the proton-generating species is impregnated in a porous carrier. In some embodiments, the porous carrier is inert. In some embodiments, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some embodiments, the porous carrier can have a particle size of from 0.02 mm to 1 inch (e.g., 0.125 inch, 0.25 inch, 0.50 inch, or 0.75 inch), in their largest dimension. In some embodiments, the porous carrier can have dimensions substantially equal to 0.25 inch by 0.167 inch, 0.125 inch by 0.10 inch, 0.25 inch by 0.125 inch, 0.125 inch by 0.50 inch, or 0.50 inch by 0.75 inch. In some embodiments, the porous carrier is uniformly impregnated throughout the volume of the porous carrier via the pores, channels, and the like, with the at least one proton-generating species.

In some embodiments, the porous carrier is impregnated with the proton-generating species by using a porous carrier that has a low moisture content. In some embodiments, the low moisture content is 5% or less (e.g., 4% or less, 3% or less, 2% or less, or 1% or less) by weight. In some embodiments, the porous carrier has an initial moisture content above 5% and thus can be dehydrated to produce a moisture content of 5% or less. In some embodiments, the dehydrated porous carrier is then immersed in or sprayed with an aqueous solution of the proton-generating species at an elevated temperature (e.g., in the range from 120° F. to 190° F.) and the resulting slurry is thoroughly mixed. In some embodiments, the mixed slurry is then air-dried to a moisture level of from 0% to 20% (e.g., from 2% to 18%, from 4% to 16%, from 6% to 14%, from 8% to 12%) by weight to produce an impregnate (i.e., proton-generating species impregnated in a porous carrier). In some embodiments, the impregnate disclosed herein can be prepared without a drying step by calculating the amount of the aqueous solution of the proton-generating species needed to achieve the desired final moisture level (e.g., from 0% to 20%, from 2% to 18%, from 4% to 16%, from 6% to 14%, from 8% to 12% by weight) and adding this amount of the aqueous solution to the dehydrated porous carrier to impregnate the porous carrier. In some embodiments, the porous carrier include from 1% to 50% proton-generating species (e.g., from 5% to 45%, from 1% to 35%, from 10% to 30%), from 0% to 20% water (e.g., 15% or less, 10% or less, 5% or less), and from 50% to 98.5% porous carrier (e.g., from 55% to 95%, from 60% to 90%, from 65% to 85%) by weight. In some embodiments, the proton-generating species is provided in excess of the stoichiometric amount required to produce chlorine dioxide gas when reacting with the chlorine dioxide precursor.

In some embodiments, the porous carrier impregnated with the proton-generating species is separate from the porous carrier that is impregnated with the chlorine dioxide precursor. In some embodiments, the porous carrier impregnated with the proton-generating species is separate from the porous carrier that is impregnated with the chlorine dioxide precursor and is separate from the porous carrier that is impregnated with the water-retaining substance. In some embodiments, the porous carrier impregnated with the proton-generating species is separate from the porous carrier that is impregnated with the chlorine dioxide precursor and water-retaining substance. In some embodiments, zeolite crystals are formed through the use of an aqueous solution of the proton-generating species in the manner described above with respect to the chlorine dioxide precursor.

The proton-generating species (whether impregnated in a porous carrier or not) and the chlorine dioxide precursor (whether impregnated in a porous carrier or not) can be mixed or otherwise combined. In some embodiments, the mixture is sprayed or coated on a surface. In some embodiments, the mixture is absorbed into a material such as a sponge, pad, mat, or the like. In some embodiments, the mixture can be placed in a reservoir, container, box, sachet, or the like.

In some embodiments, the proton-generating species is provided in the same enclosure with an impregnate comprising the chlorine dioxide precursor impregnated in a porous carrier. In some embodiments, the enclosing material can include any enclosing material that is substantially impervious to liquid water. In some embodiments, the mixture is placed in a humidity-activated sachet and enclosed within an enclosing material such as a membrane. Exemplary membranes include, but are not limited to, a polyethylene or paper filter. Exemplary commercially available enclosing materials include, but are not limited to, TYVEK® and GORTEX®. In some embodiments, the enclosing material allows water vapor to enter the enclosure. In some embodiments, the enclosing material allows chlorine dioxide gas to be released from the enclosure and enter the atmosphere. In some embodiments, the enclosing material is a sachet comprising three layers of membrane material forming a two-compartment sachet to separate the proton-generating species (whether impregnated in a porous carrier or not) from the chlorine dioxide precursor (whether impregnated in a porous carrier or not). In some embodiments, the multiple layers of membrane material can be selected from different membrane materials, wherein the permeability of the outer membrane can determine how fast humidity can enter the sachet to activate the precursor and the proton-generating species. In some embodiments, the multiple layers of membrane material can be selected from different membrane materials, wherein the center membrane can determine how fast the protons from the proton-generating source can pass to the precursor to react and generate chlorine dioxide.

In some embodiments, the chlorine dioxide gas is generated by mixing a sodium chlorite solution and hydrochloric acid solution.

The chlorine dioxide concentration produced adjacent the object is sufficient to treat the surface. In certain embodiments, the chlorine dioxide concentration adjacent to the object is 5 mg/L or less (5 mg per liter of atmosphere surrounding the object). For example, the chlorine dioxide concentration can be 4.5 mg/L or less, 4 mg/L or less, 3.5 mg/L or less, 3 mg/L or less, 2.5 mg/L or less, 2 mg/L or less, 1.5 mg/L or less, 1 mg/L or less, or 0.5 mg/L or less. In certain embodiments, the chlorine dioxide concentration adjacent to the object is at least 0.01 mg/L (e.g., at least 0.05 mg/L, at least 0.1 mg/L, at least 0.2 mg/L, at least 0.3 mg/L, at least 0.4 mg/L, or at least 0.5 mg/L, or at least 1 mg/L). In some examples, the chlorine dioxide is produced adjacent to the object in a closed container. In some examples, the chlorine dioxide concentration is measured by photometric absorption techniques (e.g., infrared spectroscopy, atomic absorption spectroscopy, etc) and specifically is measured herein using a UV spectrophotometer in the ultraviolet to visible region (e.g., at a wavelength of from $10^{-4}$ to $10^{-5}$ m).

In some embodiments, the surface of the object is contacted with chlorine dioxide for at least 5 minutes. For example, the object can be contacted with chlorine dioxide for at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, at least 60 minutes, at least 75 minutes, at least 90 minutes, at least 120 minutes, at least 150 minutes, at least 4 hours, at least 6 hours, at least 12 hours, at least 18 hours, at least 24 hours, or at least 48 hours.

The chlorine dioxide treatment can be conducted in an environment with any relative humidity consistent with the methods described herein. In some embodiments, the chlorine dioxide treatment can be conducted with a relative humidity (with a humidity adjacent the object) of 90% or less, 85% or less, 80% or less, 75% or less, 70% or less. 65% or less, 60% or less, 55% or less, 50% or less, 45% or less, 40% or less, 35% or less, 30% or less, 25% or less, 20% or less, 15% or less, 10% or less, or 5% or less.

The chlorine dioxide treatment can be conducted with a low light intensity or in the absence of light. In some embodiments, the surface of the object can be exposed to a light intensity of less than 1000 lux, less than 900 lux, less than 800 lux, less than 700 lux, less than 600 lux, less than 500 lux, less than 400 lux, less than 300 lux, less than 200 lux, less than 150 lux, less than 100 lux, less than 50 lux, less than 25 lux, less than 15 lux, less than 10 lux, less than 5 lux, less than 4 lux, less than 3 lux, less than 2 lux, less than 1 lux, less than 0.5 lux, less than 0.1 lux, less than 0.05 lux, less than 0.01 lux, less than 0.005 lux, less than 0.001 lux, or less than 0.0005 lux. In some examples, the object is treated with chlorine dioxide in a substantially dark environment (greater than 0 to 1 lux) or a dark environment (0 lux). The intensity of the light can be measured using a handheld lux meter. Suitable lux meters are known in the art and commercially available from companies such as Sper Scientific, VWR, and Extech.

The chlorine dioxide treatment can occur at any temperature consistent with the methods described herein. In some embodiments, the temperature can be the ambient environmental temperature. In some embodiments, the temperature can be from 0 to 40° C. (e.g., 5-25° C.).

In some embodiments, the object can include any object where treatment is desirable, e.g., to kill biological contaminants. In some embodiments, the object comprises a raw agricultural product. Examples of raw agricultural products include vegetables, fruits, grains, nuts, and mixtures thereof. In some embodiments the raw agricultural product includes a fruit, a vegetable, or a combination thereof.

The method limits the amount of chlorine-containing residue that forms on the surface of the object as a result of the chlorine dioxide treatment. In some embodiments, the total amount of chlorate and perchlorate ions formed on the surface of the object from said contacting step is 190 µg/kg of the object or less. For example, the total amount of chlorate and perchlorate ions formed can be 190 µg/kg or less, 180 µg/kg or less, 170 µg/kg or less, 160 µg/kg or less, 150 µg/kg or less, 140 µg/kg or less, 130 µg/kg or less, 120 µg/kg or less, 110 µg/kg or less, 100 µg/kg or less, 90 µg/kg or less, 80 µg/kg or less, 70 µg/kg or less, 60 µg/kg or less, 50 µg/kg or less, 40 µg/kg or less, 30 µg/kg or less, 20 µg/kg or less, 10 µg/kg or less, 5 µg/kg or less, or 1 µg/kg or less. In some embodiments, the surface of the object and the interior surface of the container are rinsed with water after the contacting step. The rinse waters are collected and analyzed via ion chromatography to assess the ion concentrations of interest.

In some embodiments, the amount of chlorate ions formed on the surface of the object from said contacting step is 160 µg/kg of the object or less. For example, the amount of chlorate ions can be 160 µg/kg or less, 150 µg/kg or less, 140 µg/kg or less, 130 µg/kg or less, 120 µg/kg or less, 110 µg/kg or less, 100 µg/kg or less, 90 µg/kg or less, 80 µg/kg or less, 70 µg/kg or less, 60 µg/kg or less, 50 µg/kg or less, 40 µg/kg or less, 30 µg/kg or less, 20 µg/kg or less, 10 µg/kg or less, 5 µg/kg or less, or 1 µg/kg or less.

In some embodiments, the amount of perchlorate ions formed on the surface of the object is 30 µg/kg of the object or less. For example, the total amount of perchlorate can be 30 µg/kg or less, 25 µg/kg or less, 20 µg/kg or less, 15 µg/kg or less, 10 µg/kg or less, 7.5 µg/kg or less, 5 µg/kg or less, 4 µg/kg or less, 3 µg/kg or less, 2 µg/kg or less, or 1 µg/kg or less.

By way of non-limiting illustration, examples of certain embodiments of the present disclosure are given below.

EXAMPLES

Example 1

Gas Chamber Studies Confirmed Chlorine Dioxide by-Products are Influenced by Light

Example 1a

Chlorine dioxide gas was generated within sealed 1 quart (0.95 L) glass canning jars for a period of two hours during which half of the jars were exposed to ambient light (fluorescent lighting in laboratory; estimated light intensity, 900 Lux), and half were shielded from light by an aluminum foil wrap. The chlorine dioxide was generated within the jars from a two part dry mixture of particles within gas permeable TYVEK sachets. At the end of the two hour exposure period, the jars were unsealed, the sachets removed, and unreacted $ClO_2$ vented to a hood. Residues on the walls of each jar were quantitatively recovered by washing the walls sequentially with 4-50 mL aliquots of nanopure water and combining the aliquots with additional water to bring the total volume to 250 mL. These washings were analyzed by ion chromatography for chlorate and perchlorate ions.

Based on reaction profiling of these particle mixtures, the weights of the particles provided within the TYVEK sachets were adjusted so that, upon reacting, a total of 1.6 mg of $ClO_2$ would have been produced in each jar during the 2 hour period. Four replicate experiments were conducted under both light and dark conditions.

Table 1a shows the concentration of perchlorate and chlorate ions (both as sodium salts) in recovered wash water. Each value represents the average and standard deviation of 4 replicate experiments.

TABLE 1a

Effect of light on production of chlorate and perchlorate with 1.6 mg $ClO_2$ produced from dry reagent mixture.

| Condition | Light | Dark |
|---|---|---|
| Perchlorate (µg/L) | 456 ± 233 | NDR |
| Chlorate (µg/L) | 988 ± 54 | 11 |

*NDR = No Detectable Residue

Example 1b

Conditions are identical to those in Example 1a, except that ClO2 was generated from a two-part liquid phase mixture consisting of a sodium chlorite solution and a hydrochloric acid solution placed within TYVEK sachets. Based on reaction profiling, the volumes and concentrations of the two solutions were adjusted so that, upon reacting, a total of 1.6 mg of ClO2 would have been produced in each jar during the 2 hour period. Table 1b shows the concentration of perchlorate and chlorate (both as sodium salts) in recovered wash water. Each value represents the average and standard deviation of 4 replicate experiments.

TABLE 1b

Effect of light on production of chlorate and perchlorate with 1.6 mg $ClO_2$ produced from liquid reagent mixture.

| Condition | Light | Dark |
|---|---|---|
| Perchlorate (µg/L) | 438 ± 98 | NDR |
| Chlorate (µg/L) | 2733 ± 267 | <LOQ |

*LOQ = limit of quantification

Example 2

Gas Chamber Studies Confirmed the Formation of Chlorate and Perchlorate can Also be Influenced by as Concentration

Example 2a

Conditions are identical to those in Example 1a, except that an amount of two part dry mixture was used that would produce a total of 7.8 mg of ClO2 during a two hour period. Table 2a shows the concentration of perchlorate and chlorate (both as sodium salts) in recovered wash water. Each value represents the average and standard deviation of 4 replicate experiments.

TABLE 2a

Effect of light on production of chlorate and perchlorate with 7.8 mg $ClO_2$ produced from dry reagent mixture.

| Condition | Light | Dark |
|---|---|---|
| Perchlorate (µg/L) | 4334 ± 838 | NDR |
| Chlorate (µg/L) | 4857 ± 641 | NDR |

Example 2b

Conditions are identical to those in Example 1b, except that an amount of liquid phase reagent mixture was used that would produce a total of 7.8 mg of ClO2 during a two hour period. Table 2b shows the concentration of perchlorate and chlorate (both as sodium salts) in recovered wash water. Each value represents the average and standard deviation of 4 replicate experiments.

TABLE 2b

Effect of light on production of chlorate and perchlorate with 7.8 mg $ClO_2$ produced from liquid reagent mixture.

| Condition | Light | Dark |
|---|---|---|
| Perchlorate (µg/L) | 880 ± 211 | NDR |
| Chlorate (µg/L) | 17497 ± 775 | 11 ± 2 |

Example 3

Gas Chamber Studies Show Chlorate and Perchlorate Ions can be Minimized and in the Case of Perchlorate Eliminated when Fumigation is Performed in the Substantial Absence of Light when RACs are Present Example 3a Chlorine dioxide gas was generated within sealed 5.4 L glass chambers (10.8×22×22.8 cm (w×l×d) thin layer chromatography (TLC) tanks) each containing a 100 g (ca.) tomato supported on a porous glass pedestal. During a 2 hour period, each tomato was exposed to 5.5 mg of ClO2 gas that was generated from a gas permeable TYVEK sachet that had been charged with a two part dry mixture of particles and placed inside the chamber. A magnetic stirrer allowed the circulation of gas within each chamber. In half of the experiments, the chambers were exposed to ambient light (per Example 1a), and in the other half, the chambers were shielded from light by aluminum foil wrap.

Each chamber had a glass lid equipped with entry and exit portals that were sealed with 1.3 cm butyl septa. The lip of the chamber was treated with a light layer of silica vacuum grease so that upon addition of a sachet, the chamber could be sealed.

At the end of the 2 hour exposure period, residual chlorine dioxide gas was swept out of the chambers by passing air through the entry and exit portals and bubbling the exiting gas through a sodium thiosulfate solution to convert the $ClO_2$ to sodium chloride.

Tomatoes were removed with tongs and washed with approximately 200 mL of nanopure water to quantitatively recover surface residues. More water was added to bring the total volume to 250 mL in a volumetric flask. Each reaction chamber and remaining contents (glass pedestal and magnetic stir bar) were rinsed with 100 mL of nanopure water in triplicate. The rinse water was placed in a 500 mL flask and water added to the mark. Aliquots of wash waters were analyzed for chlorate and perchlorate ions by ion chromatography.

Based on previous reaction profiling of these particle mixtures, the weights of the particulates were adjusted so that upon reacting, a total of 5.5 mg of $ClO_2$ would have been produced in each chamber during the 2 hour period. Four replicate experiments were conducted under both light and dark conditions.

Table 3a shows the concentration of perchlorate and chlorate ions (both as sodium salts) in recovered wash water. Each value represents the average and standard deviation of 4 replicate experiments. Table 3a-1 shows the concentration of perchlorate and chlorate ions (both as sodium salts) in recovered wash water from the surface of the tomato, expressed in terms of µg residue/kg tomato (or ppb).

TABLE 3a

Effect of light on production of chlorate and perchlorate with 5.5 mg $ClO_2$ produced from dry reagent mixture.

| Condition | | Light | Dark |
|---|---|---|---|
| Tomato Rinse | Perchlorate (µg/L) | 22 ± 15 | NDR |
| (250 mL) | Chlorate (µg/L) | 66 ± 46 | 12 ± 3 |
| Chamber Rinse | Perchlorate (µg/L) | 108 ± 91 | NDR |
| (500 mL) | Chlorate (µg/L) | 623 ± 299 | 5 |

*LOD = Limit of detection; LOD $NaClO_4$ = 1 µg/L; LOD $NaClO_3$ = 1 µg/L

TABLE 3a-1

Effect of light on production of chlorate and perchlorate with 5.5 mg $ClO_2$ produced from dry reagent mixture.

| Condition | | Light | Dark |
|---|---|---|---|
| Tomato Rinse | Perchlorate (µg/kg) | 55 | 2.5 |
| (250 mL) | Chlorate (µg/kg) | 165 | 30 |

*LOD $NaClO_4$ = 2.5 µg/kg (calculated from LOD for rinse water analysis)

Example 3b

Conditions are identical to those in Example 3a, except that ClO2 was generated from a two-part liquid phase mixture consisting of a sodium chlorite solution and a hydrochloric acid solution placed within the TYVEK sachets. Based on previous reaction profiling, the volumes and concentrations of the two solutions were adjusted so that upon reacting, a total of 5.5 mg of ClO2 would have been produced in each chamber during the 2 hour period. Table 3b shows the concentration of perchlorate and chlorate ions (both as sodium salts) in recovered wash water. Each value represents the average and standard deviation of 4 replicate experiments. Table 3b-1 shows the concentration of perchlorate and chlorate ions (both as sodium salts) that was washed off the tomato surface, expressed as µg residue/kg tomato (or ppb).

TABLE 3b

Effect of light on production of chlorate and perchlorate with 5.5 mg $ClO_2$ produced from liquid reagent mixture.

| Condition | | Light | Dark |
|---|---|---|---|
| Tomato Rinse | Perchlorate (µg/L) | 17 ± 7 | NDR |
| (250 mL) | Chlorate (µg/L) | 70 ± 12 | 20 ± 19 |
| Chamber Rinse | Perchlorate (µg/L) | 113 ± 47 | NDR |
| (500 mL) | Chlorate (µg/L) | 600 ± 241 | <LOQ |

*LOD $NaClO_4$ = 1 µg/L; LOD $NaClO_3$ = 1 µg/L; LOQ $NaClO_3$ = 5 µg/L

TABLE 3b-1

Effect of light on production of chlorate and perchlorate with 5.5 mg $ClO_2$ produced from liquid reagent mixture.

| Condition | | Light | Dark |
|---|---|---|---|
| Tomato Rinse | Perchlorate (µg/kg) | 43 | 2.5 |
| (250 mL) | Chlorate (µg/kg) | 175 | 50 |

Example 4

Radio Label Studies Show Chlorite Ion is Effectively Reacted on RAC Surfaces Conditions are identical to those in Example 3b, except that radioactive chlorine dioxide ($^{36}ClO_2$) was generated in the chamber from a two-part liquid phase mixture consisting of radiolabelled sodium chlorite ($Na^{36}ClO_2$) solution and hydrochloric acid solution placed within the TYVEK sachets. Three separate experiments were conducted, two in which the chambers were exposed to ambient light, and one in which the chamber was shielded from light by an aluminum foil wrap. The tomato weights in these experiments ranged from 75 to 108 g. Tomato rinse water was analyzed for $^{36}Cl$-chlorite, $^{36}Cl$-chloride, $^{36}Cl$-chlorate and $^{36}Cl$-perchlorate by first trapping fractions eluted from an ion chromatograph, and applying liquid scintillation counting of the trapped fractions. The mass concentrations were determined by dividing total radioactivity of each species by their respective specific activity.

Table 4 shows the concentration of $^{36}Cl$-chlorite, $^{36}Cl$ chloride, $^{36}Cl$ chlorate and $^{36}Cl$ perchlorate (as sodium salts) in recovered tomato rinse water. Table 4-1 shows the concentration of $^{36}Cl$-chlorite, $^{36}Cl$ chloride, $^{36}Cl$ chlorate and $^{36}Cl$ perchlorate (as sodium salts) in recovered tomato rinse water expressed as μg residue/kg tomato (or ppb).

TABLE 4

Residue speciation on tomato surfaces with 5.4 mg $^{36}ClO_2$ produced from liquid reagent mixture.

| | Condition | Light | Light | Dark |
|---|---|---|---|---|
| | Tomato weight (g) | 75 | 98 | 108 |
| Tomato Rinse (250 mL) | Chlorite (μg/L) | <LOQ | <LOQ | <LOQ |
| | Chloride (μg/L) | 220 | 110 | 320 |
| | Chlorate (μg/L) | 650 | 920 | 70 |
| | Perchlorate (μg/L) | 110 | 280 | NDR |

*LOQ (Chlorite) = 10 μg/L

TABLE 4-1

Residue speciation on tomato surfaces with 5.4 mg $^{36}ClO_2$ produced from liquid reagent mixture.

| | Condition | Light | Light | Dark |
|---|---|---|---|---|
| | Tomato weight (kg) | 0.075 | 0.098 | 0.108 |
| Tomato Rinse (250 mL) | Chlorite (μg/L) | <LOQ | <LOQ | <LOQ |
| | Chloride (μg/L) | 733 | 281 | 741 |
| | Chlorate (μg/L) | 2167 | 2347 | 162 |
| | Perchlorate (μg/L) | 367 | 714 | 23 |

Example 5

Radio Label Studies Show Perchlorate is Formed in the as Phase or on Container Walls Surfaces as a Result of Chlorine Dioxide Decomposition and not as a Result of Chemistry on the Surfaces of RACs Chamber rinse water was collected in the three experiments described in Example 4 and analyzed for $^{36}Cl$-chlorite, $^{36}Cl$ chloride, $^{36}Cl$ chlorate and $^{36}Cl$ perchlorate by first trapping fractions eluted from an ion chromatograph, and applying liquid scintillation counting of the trapped fractions. The mass concentrations were determined by dividing total radioactivity of each species by their respective specific activity.

Table 5 shows the concentration of $^{36}Cl$-chlorite, $^{36}Cl$ chloride, $^{36}Cl$ chlorate and $^{36}Cl$ perchlorate (as sodium salts) in recovered chamber rinse water.

TABLE 5

Residue speciation on chamber surfaces with 5.4 mg $^{36}ClO_2$ produced from liquid reagent mixture.

| | Condition | Light | Light | Dark |
|---|---|---|---|---|
| | Tomato weight (g) | 75 | 98 | 108 |
| Chamber Rinse (500 mL) | Chlorite (μg/L) | 10 | NM | 10 |
| | Chloride (μg/L) | 80 | NM | 80 |
| | Chlorate (μg/L) | 3140 | NM | 10 |
| | Perchlorate (μg/L) | 590 | 1100 | 10 |

NM = Rinse water was not analyzed for chlorite, chloride or chlorate

Example 6

Residue Studies Show RACs are a Strong Sink for Chlorine Dioxide and can be Used to Effectively Decrease as Concentrations Such that Perchlorate and Chlorate Residues are Minimized Sets of ripened tomatoes (approximately 7 kg) were exposed to chlorine dioxide gas (50 mg/kg of tomato) in sealed containers for a two-hour period. Identical negative control vessels contained 7 kg of tomatoes, but were not charged with a chlorine dioxide generating system. Positive control vessels contained the chlorine dioxide generating system, but no tomatoes. All fumigations were conducted under conditions of reduced illumination (<5 lux). Chlorine dioxide concentrations were determined during fumigations at 10, 20, 30, 45, 60, 90 and 120 minutes by removing 5 to 10 mL aliquots of container gas at the indicated sampling times and analyzing the samples using a Rhodamine-B based spectrophotometric assay as described by Xin and Jinyu (1995).

FIG. 1 shows the generation of chlorine dioxide in empty and tomato-filled chambers and the theoretical concentrations of chlorine dioxide expected from the dry media. The release of chlorine dioxide from the dry media in the absence of tomatoes closely followed the theoretical amounts of chlorine dioxide expected through 90 minutes. At 120 minutes, chlorine dioxide concentrations, in the absence of tomatoes, fell well below expected concentrations, likely due to system leaks or to chlorine dioxide reacting with the exposure chambers themselves or with the silicone sealant used on the tanks. When tomatoes were present in the treatment chambers, chlorine dioxide gas was measurable only through 30 minutes for two replicates and through 60 minutes for one replicate. These data clearly indicate that tomatoes acted as a chlorine dioxide sink, consistent with studies using radiolabel showing the propensity for chlorine dioxide consumption by biologic materials, especially those tissues with a porous surface such as cantaloupe skin and the stem area of tomatoes.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A method for treating an object with chlorine dioxide gas while minimizing chlorine-containing residue on the object, comprising contacting the object with chlorine dioxide gas while exposing the object to less than 1000 lux of light, wherein the chlorine dioxide gas is generated at less than 1000 lux of light by mixing particles of a chlorine dioxide precursor and a proton generating species, the total amount of chlorate and perchlorate formed on the surface of the object is 190 µg/kg of the object or less, and the object comprises a raw agricultural product.

2. The method of claim 1, wherein said exposing step comprises exposing the object to less than 200 lux of light.

3. The method of claim 1, wherein the chlorine dioxide concentration adjacent the object during said treating step is 5 mg/L or less.

4. The method of claim 3, wherein the chlorine dioxide concentration adjacent the object during said treating step is 2 mg/L or less.

5. The method of claim 3, wherein the treating step comprises treating the object at a humidity of 70% or less.

6. The method of claim 1, wherein the total amount of chlorate formed on the surface of the object from said contacting step is 160 µg/kg of the object or less.

7. The method of claim 1, wherein the total amount of perchlorate formed on the surface of the object from said contacting step is 30 µg/kg of the object or less.

8. The method of claim 1, wherein the raw agricultural product includes a fruit, a vegetable, or a combination thereof.

9. The method of claim 1, wherein the object is contacted with chlorine dioxide in a substantially dark or dark environment.

10. The method of claim 1, wherein the object is contacted with chlorine dioxide for at least 5 minutes.

11. The method of claim 1, wherein the treating step comprises treating the object at a temperature of 0–40° C.

12. The method of claim 1, wherein said exposing step comprises exposing the object to less than 100 lux of light.

13. The method of claim 1, wherein the treating step comprises treating the object at a humidity of 70% or less.

14. A method for treating an object with chlorine dioxide gas while minimizing chlorine-containing residue on the object, comprising contacting the object with chlorine dioxide gas while exposing the object to less than 1000 lux of light, wherein the chlorine dioxide gas is generated at less than 1000 lux of light by mixing particles of a chlorine dioxide precursor and a proton generating species, wherein the treating step comprises treating the object at a humidity of 70% or less.

15. The method of claim 14, wherein the total amount of chlorate and perchlorate formed on the surface of the object from said contacting step is 190 µg/kg of the object or less.

16. The method of claim 14, wherein the object comprises a raw agricultural product.

17. The method of claim 14, wherein said exposing step comprises exposing the object to less than 100 lux of light.

* * * * *